United States Patent [19]

Iwata et al.

[11] Patent Number: 5,351,387
[45] Date of Patent: Oct. 4, 1994

[54] METHOD OF MAKING A MAGNETIC ROTATION SENSOR

[75] Inventors: Hitoshi Iwata; Katsuhiro Minami; Hisahiro Ando; Hisashi Hirose; Shigeru Iguchi, all of Aichi, Japan

[73] Assignee: Kabushiki Kaisha Tokai Rika Denki Seisakusho, Aichi, Japan

[21] Appl. No.: 977,294

[22] Filed: Nov. 16, 1992

Related U.S. Application Data

[62] Division of Ser. No. 794,061, Nov. 19, 1991, Pat. No. 5,239,263.

[30] Foreign Application Priority Data

Nov. 20, 1990 [JP] Japan .................. 2-121703

[51] Int. Cl.$^5$ .................. H01F 7/06; G01B 7/14; G01N 27/72; G01R 33/12
[52] U.S. Cl. .................. 29/602.1; 324/207.25; 324/207.2
[58] Field of Search .................. 324/207.25, 174, 207.2; 29/592.1, 595, 602.1; 335/302; 361/143

[56] References Cited

U.S. PATENT DOCUMENTS 4,801,830  1/1989  Ogino et al. .
4,983,916  1/1991  Iijima et al. .
5,117,183  5/1992  Santos .................. 324/228

Primary Examiner—Walter E. Snow
Attorney, Agent, or Firm—Finnegan, Henderson, Farabow, Garrett & Dunner

[57] ABSTRACT

This invention relates to a rotation sensor which detects the magnetic field which changes with the rotation of a rotary shaft, thereby to detect the amount of rotation of the rotary shaft. The rotation sensor of the present invention has the boundaries between magnetized regions set with high precision. The boundaries forms magnetic fields stably, whereby the detection of rotation is performed with high accuracy.

2 Claims, 2 Drawing Sheets

METHOD OF MAKING A MAGNETIC ROTATION SENSOR

This is a continuation division of application Ser. No. 07/794,061, filed Nov. 19, 1991, now U.S. Pat. No. 5,239,263.

BACKGROUND OF THE INVENTION

This invention relates to a rotation sensor which detects the magnetic field which changes with the rotation of a rotary shaft, thereby to detect the amount of rotation of the rotary shaft.

The principle of detection with a rotation sensor of this type is as follows: A magnet, which is so magnetized that N and S poles are provided alternately as viewed in the circumferential direction, is secured to a rotary shaft so that it is rotated together with the latter. Under this condition, a magnetic sensor is used to detect the magnetic field of the magnet which changes with rotation of the rotary shaft, thereby to detect the station of rotation of the rotary shaft. That is, since the N and S poles are provided alternately as viewed in the circumferential direction, as the magnet rotates the direction of the magnetic field changes from circumferential direction to radial direction or vice versa at each of the boundaries between the N and S poles. This change is detected for the state of rotation of the rotary shaft.

In this case, the accuracy of detection for the state, of rotation; that is, the resolving power can be increased by increasing the number of changes in magnetic field per revolution; that is, by increasing the number of magnetic poles formed in the magnet in the circumferential direction. In general, increasing the number of magnetic poles in a magnet will decrease the magnetic field strength per magnetic pole. This affects the sensitivity of detection of the magnetic sensor, and therefore the increasing of the number of magnetic poles makes it difficult to improve the accuracy of detection.

In order to eliminate this difficulty, the following method has been proposed in the art. As shown in FIG. 4, a magnet 1 is formed in such a manner that N and S poles appear alternately in a radial direction. More specifically, in the magnet 1, N and S poles are provided alternately both in the circumferential direction and in the radial direction, so that, in the detecting surface 2, the magnetic flux extends radially as well as circumferentially (as indicated by the arrows In FIG. 4). This increases the region where parallel magnetic fields are obtained, and, therefore, with the same magnetization, the magnetic field formed is higher. Hence, although the number of magnetic poles is increased, the change in the direction of magnetic field can be satisfactorily detected with the magnetic sensor; that is, the accuracy of detection of the magnetic sensor can be improved.

In the above-described conventional rotation sensor, the magnetization of the magnet 1 is carried out as follows: As shown in FIG. 5, a U-shaped magnetizing yoke 3 is employed to form N and S poles in the magnetizing surface 2 of the magnet alternately in a radial direction. However, since the surface 2 is small, it is considerably difficult to form N and S poles alternately therein with high accuracy, and accordingly it is difficult to accurately locate the neutral line M between N and S poles. Hence, when the magnet 1 is rotated, the change in magnetic field detected by the magnetic sensor 4 is not uniform. Thus, the output of the magnetic sensor is unstable, and accordingly the accuracy of detection is lowered as much.

SUMMARY OF THE INVENTION

In view of the foregoing, an object of the invention is to provide a rotation sensor in which the boundaries between magnetized regions are set with high precision to form magnetic fields stably, whereby the detection of rotation is performed with high accuracy.

The foregoing object of the invention has been achieved by the provision of a rotation sensor which, according to the invention, comprises: a magnetic substance in the form of a hollow cylinder or in the form of a solid cylinder which rotates together with a rotary shaft; an annular magnet having an end face which is magnetized in such a manner that N and S poles appear alternately as viewed in the circumferential direction thereof, the annular magnet being fixedly mounted on the magnetic substance in such a manner that the end face thereof is flush with the end face of the magnetic substance; and a magnetic sensor for detecting the magnetic flux which changes with rotation of the rotary shaft with the end faces of the magnetic substance and annular magnet as a detecting surface.

In the rotation sensor of the invention, N and S poles are formed in the end face of the magnet alternately in the circumferential direction. When the magnet is mounted on the magnetic substance, the magnetic flux of the magnet runs in the magnetic substance, thus forming magnetic paths therein. As a result, magnetic poles are formed in the end face of the magnetic substance. Hence, in the rotation sensor of the invention, the neutral lines between N and S poles are more clearly with mechanical accuracy than in the conventional rotation sensor in which N and S poles are formed alternately in a radial direction. Accordingly, the change in magnetic field is stable when detected by the magnetic sensor. Thus, with the rotation sensor of the invention, the state of rotation of the rotary shaft can be detected with high accuracy.

DETAILED DESCRIPTION OF THE PREFERRED EMBODIMENTS

Figure 1:
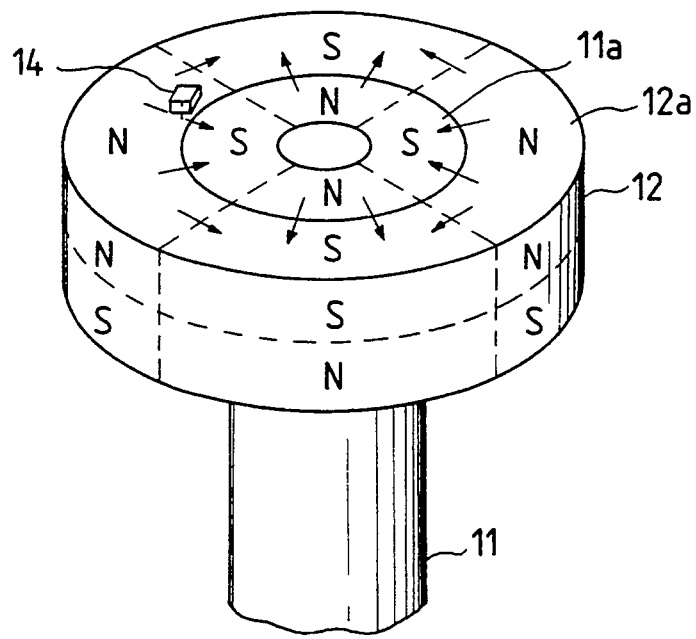
FIGS. 1 and 2 are a perspective view and a vertical sectional view showing the whole arrangement of the rotation sensor of the present invention.

An example of a rotation sensor, which constitutes one embodiment of this invention, will be described with reference to FIGS. 1 through 3.

First, the whole arrangement of the rotary sensor will be described. As shown in FIG. 1, a rotary shaft 11, which is a magnetic substance, is cylindrical, and has an end portion 11a larger in diameter than the other portion. The rotary shaft 11 is engaged with an annular magnet 12. The annular magnet 12 is so magnetized that N and S magnetic poles appear alternately in the circumferential direction. More specifically, as shown in FIG. 3, a number of magnetic poles are formed in the magnetizing surface 12a of the magnet in such a manner that they are arranged in the circumferential direction, and a single magnetic pole is provided as viewed in a radial direction. A magnetizing yoke 13 is set above the magnetizing surface 12a. Hence, not only the magnetic poles are formed in the magnetizing surface 12a as described above, but also different magnetic poles are formed in the opposite surface which are opposite in polarity to those formed in the magnetizing surface 12a. That is, in the annular magnet 12, the magnetic poles are opposite to each other as viewed in the axial direction (cf. FIG. 1 too). The annular magnet 12 thus formed is fixedly mounted on the rotary shaft 11 in such a manner that, as shown in FIG. 2, the inner cylindrical wall of the annular magnet 12 is in contact with the outer cylindrical wall of the end portion 11a of the rotary shaft 11, and the end face of the rotary shaft 11 is flush with the magnetizing surface 12a of the annular magnet 12. A magnetic sensor made up of a magnetic resistance element or a Hall element for magnetic detection, is positioned above the boundary between the magnetizing surface 12a of the magnet 12 and the end face of the end portion 11a of the rotary shaft 11.

Figure 2:
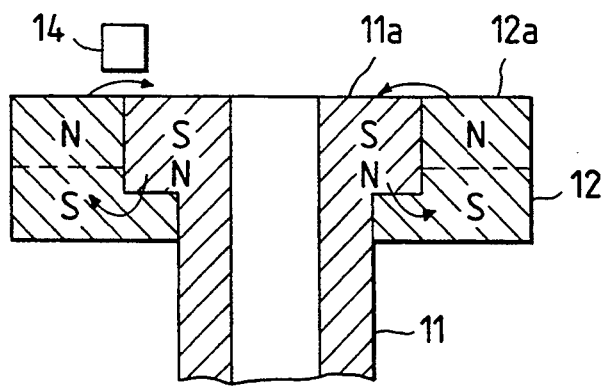
Figure 3:
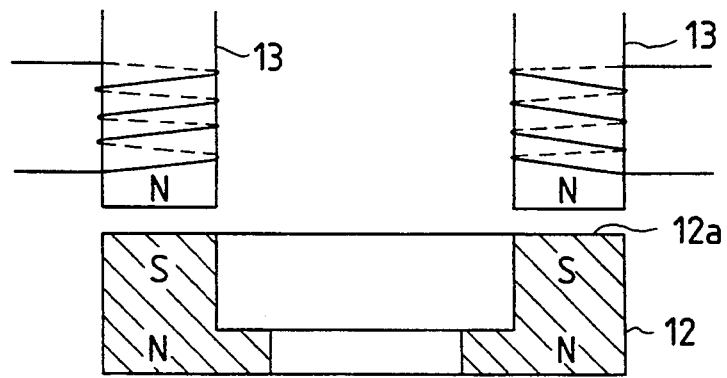
FIG. 3 is an explanatory diagram for a description of the magnetization of a magnet of the present invention.
Figure 4:
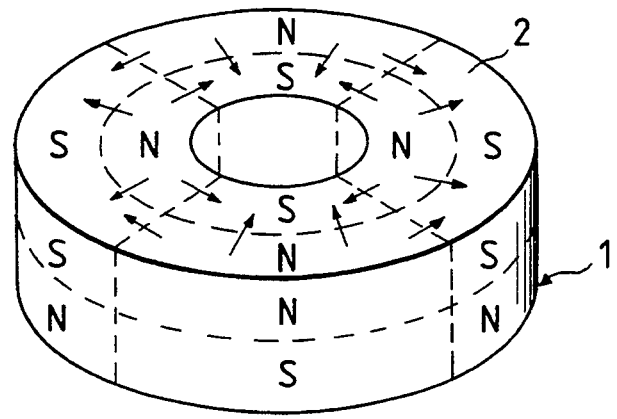
FIG. 4 is a perspective view of a conventional rotation sensor.
Figure 5:
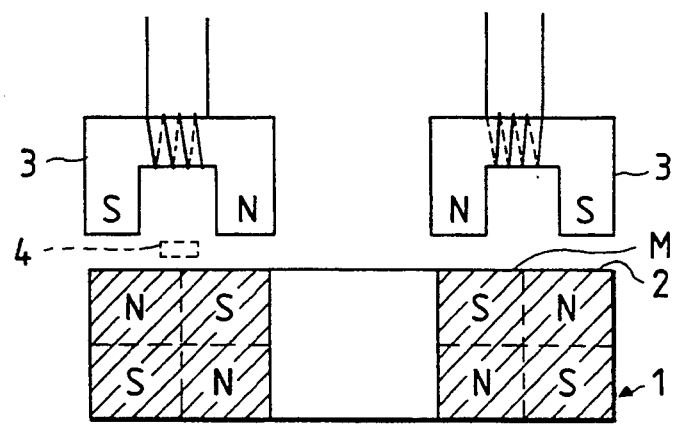
FIG. 5 is a diagram for a description of the magnetization of a magnet of the conventional rotation sensor.

When the annular magnet 12 is fixedly mounted on the rotary shaft 11 as was described above, the lines of magnetic force of each of the magnetic poles in the magnet 12, for instance the lines of magnetic force of each N pole run through the upper end portion 11a of the rotary shaft 11, which is a magnetic substance, to the respective S pole formed in the lower portion of the magnet 12 as indicated by the arrows in FIG. 2. That is, the lines of magnetic force thus run forms a magnetic path in the upper end portion 11a of the rotary shaft 11. As a result, in the upper end portion, an S pole is formed near the N pole. Thus, in the upper end portion 11a, N and S poles are formed alternately in the circumferential direction. That is, in the assembly of the upper end portion 11a and the annular magnet 12, N and S poles appear alternately both in the circumferential direction and in the radial direction. In this case, the boundary between the magnet 12 and the rotary shaft 11 is mechanically determined; that is, in the invention, unlike the conventional art, the accuracy of magnetization is not problematic. Thus, the boundaries between the magnetic poles are clearly determined.

As was described above, in the magnetizing surface 12a, a single pole is formed as viewed in a radial direction. Hence, the magnetizing yoke 13 can be set over the whole magnetizing surface 12a, and the magnetization can be increased accordingly. Therefore, although a number of magnetic poles are provided as viewed in the circumferential direction, they will not lower the accuracy in detection of the magnetic sensor 14.

In the above-described embodiment, the rotary shaft 11 of iron is employed as the magnetic substance; however, the invention is not limited thereto or thereby. That is, for instance a magnetic substance provided separately may be connected to the rotary shaft. In the above-described embodiment, the magnetic substance is in the form of a hollow cylinder; however, the same effect can be obtained by employing a magnetic substance in the form of a solid cylinder.

As was described above, in the rotation sensor according to the invention, the magnet in which a number of magnetic poles are formed as viewed in the circumferential direction is mounted on the magnetic substance, so that the lines of magnetic force run through the magnetic substance, forming magnetic paths therein. This is equivalent to the fact that N and S poles are formed in the magnetic substance. In addition, the boundaries between the magnetic poles are located at the boundary between the magnetic substance and the magnet which is mechanically determined. Accordingly, the rotation sensor is free from the difficulty that the detection signal of the magnetic sensor is unstable; that is, it can positively detect the state of rotation with high accuracy. This effect should be highly appreciated.

What is claimed is:

1. A method for making a rotation sensor, comprising the steps of:
    magnetizing a surface of an annular magnet by setting a magnetizing yoke over the entire magnetizing surface of said annular magnet so that N and S poles are formed alternately in the circumferential direction of said annular magnet;
    fixedly mounting said annular magnet on a rotary shaft having a magnetic end portion; and
    positioning a magnetic sensor above a boundary between said magnetic end portion of said rotary shaft and said annular magnet.

2. The method of claim 1, wherein the step of magnetizing the surface of the annular magnet forms a single pole in the radial direction of the annular magnet.

* * * * *